Jan. 9, 1951 W. L. CHRISTENSEN 2,537,033
GAS TURBINE COMBUSTION CHAMBER CONSTRUCTION
Filed July 18, 1947
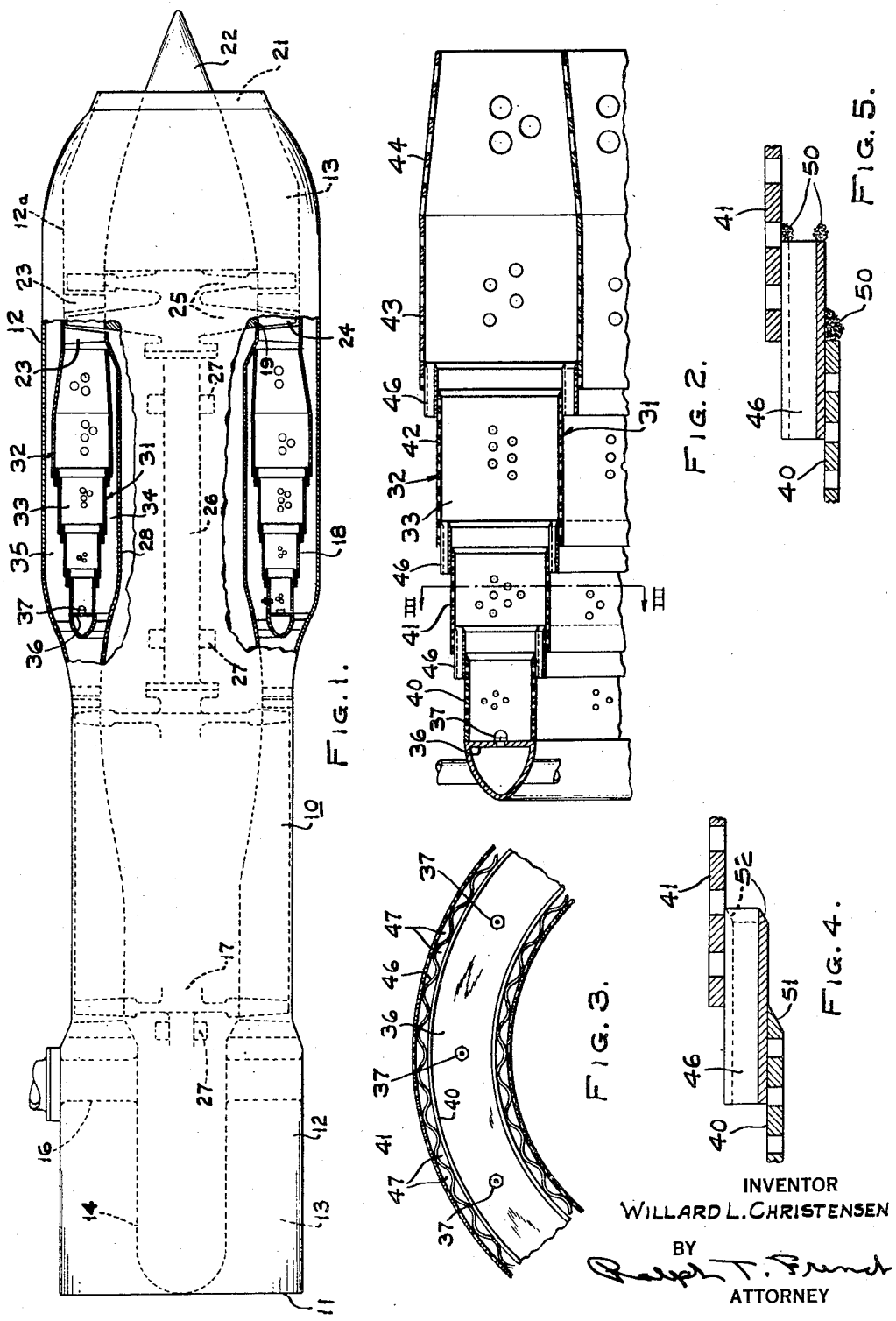
INVENTOR
WILLARD L. CHRISTENSEN
BY
ATTORNEY Patented Jan. 9, 1951

2,537,033

UNITED STATES PATENT OFFICE 2,537,033

GAS TURBINE COMBUSTION CHAMBER CONSTRUCTION

Willard L. Christensen, Moylan, Pa., assignor to Westinghouse Electric Corporation, East Pittsburgh, Pa., a corporation of Pennsylvania Application July 18, 1947, Serial No. 761,903

3 Claims. (Cl. 60—44)

This invention relates to combustion apparatus, more particularly to combustion chamber structure, and has for an object to provide novel structure of this character.

Another object of the invention is to provide a combustion chamber particularly adapted for use with fuels containing lead.

Yet another object of the invention is to provide, in a combustion chamber having air admission openings in its walls, wall structure adapted to render impossible collections of fuel refuse deposits in the vicinity of the openings.

A further object of the invention is to provide, in a combustion chamber having a stepped wall, the risers of whose steps comprise spacers between longitudinally-adjacent wall sections and which risers provide openings for admission of air to the combustion chamber, riser and/or wall section configurations such that no surface thereof exposed to the chamber interior lies in a plane approximately normal to the direction of flow of air and/or gases therepast.

Another object of the invention is to provide a combustion chamber in which internal downstream edges of wall structure are beveled to eliminate surfaces at right angles to the gas stream and on which fuel refuse deposits might otherwise accumulate.

These and other objects are effected by the invention as will be apparent from the following description and claims taken in connection with the accompanying drawing, forming a part of this application, in which:

Fig. 1 is a side elevational view of a gas turbine power plant incorporating the present invention, a portion or the outer casing and part of the inner structure being broken away to better illustrate the novel features;

Fig. 2 is an enlarged longitudinal view of the upper half of the combustion chamber shown in Fig. 1;

Fig. 3 is a transverse sectional view, taken along the line III—III of Fig. 2, looking in the direction indicated by the arrows;

Fig. 4 is an enlarged, fragmentary, longitudinal sectional view of one of the steps of the structure shown in Fig. 2; and Fig. 5 is a view similar to Fig. 4, but showing the problem solved by the present invention.

This invention, although not limited thereto, is particularly adapted for use with a gas turbine power plant of the type employed on aircraft to drive the propeller or an electric generator or to supply motive fluid for jet propulsion of the aircraft. Such a plant preferably comprises a streamlined tubular casing having mounted axially therein a compressor adjacent the forward or inlet end, a turbine adjacent the rearward or discharge end, and combustion apparatus located between the compressor and the turbine for heating the compressed air and which discharges the hot gases at suitable temperature and pressure to the turbine. The gases on leaving the turbine are discharged through a nozzle provided at the rear of the casing and may aid in propelling the aircraft.

Referring now to the drawing more in detail, the power plant shown in Fig. 1, and indicated in its entirety by the reference character 10, is adapted to be mounted in or on the fuselage or wing of an aircraft with the left end or intake 11, as viewed in this figure, pointed in the direction of flight.

The plant comprises an outer shell or casing structure 12—12a providing an annular air duct or passage 13 extending fore and aft with respect to the aircraft. This casing has mounted therein, along its longitudinal axis, a fairing cone 14 adapted to house gearing connecting through a hollow guide vane 16 with auxiliaries (not shown), an axial flow compressor 17, combustion apparatus generally indicated 18, a turbine 19 which drives the compressor, and a nozzle 21 defined by the casing 12a and by a tailpiece 22, the latter being mounted concentrically in the casing and cooperating with the latter to provide the propulsion nozzle.

Air enters at the intake 11 and flows substantially straight through the plant, passing through the compressor 17, where its pressure is raised, and into the combustion apparatus 18, where it is heated. The hot gases, comprising the products of combustion and excess air heated by the combustion, on leaving the combustion apparatus are directed by suitable guide vanes or nozzles 23 against the blades 24 of the turbine disc 25 and then are discharged through the propulsion nozzle 21 to propel the aircraft.

By reference to Fig. 1 it will be seen that the compressor and turbine rotors are interconnected by means of a shaft 26 supported by suitable bearings 27 and enclosed by an inner wall structure, generally indicated 28, which protects the shaft and bearings from high temperatures and also defines a portion of the annular air flow passage 13 in which the combustion apparatus 18 is disposed.

The present invention is not limited to the specific details or arrangements of structure thus far described, but is primarily concerned with the combustion apparatus, indicated generally at 18.

A pair of frusto-conical inner and outer wall members 31 and 32, respectively, separate the annular flow passage 13, at the region of the combustion apparatus 18, into an annular burner or combustion space 33 overlapped both inwardly and outwardly by annular air spaces 34 and 35, respectively. The inner wall 31 is disposed with its base or larger end upstream and the outer wall 32 has its larger end or base downstream, with the result that the burner space 33 defined thereby increases in cross sectional area from its upstream end to its downstream end. Conversely, the inner and outer overlapping air spaces 34 and 35, the former defined by the walls 28 and 31 and the latter by the walls 12 and 32, decrease in cross sectional area from their upstream ends to their downstream ends.

Preferably, the upstream end of the burner space 33 is closed by an annular wall 36, in which is mounted an annular series of fuel nozzles 37 adapted to direct the fuel discharging therefrom downstream in directions substantially parallel to the longitudinal axis of the power plant.

Preferably, both the inner wall 31 and the outer wall 32 have the same general construction, and hence only the outer wall 32 will be described in detail. This outer wall 32 is made up of a plurality of annular sections 40, 41, 42, 43 and 44, sections 41, 42 and 43 each being of greater diameter than the section next upstream therefrom, with the result that the wall is stepped from its upstream end to its downstream, except for the last section 44 which must be inclined inwardly to bring the downstream edge of the wall 32 into radial alignment with the outer wall of the turbine inlet passage.

The difference in diameter of the various sections is of such a degree that adjacent sections are radially spaced, and this radial spacing is maintained by spacer members 46, constituting risers for the steps. Preferably each section is welded or otherwise secured to its associated spacer members, although under certain conditions it may be found desirable to omit the welding at one joint to provide for axial expansion and contraction due to temperature changes.

In the construction herein illustrated, the spacer member 46 is in the form of a circumferentially-continuous corrugated strip, the corrugations extending axially of the combustion space 33 and providing a large number of openings or passages 47 for flow of air from the overlapping air space 35 to the burner or combustion space 33 in directions substantially parallel to the wall sections, whereby the inner surfaces of the wall sections are swept by streams of cool air interposed between the walls and the hot combustion gases within the space 33.

It has been found that under certain conditions of operation, a considerable build-up of fuel refuse deposits (for example, lead oxide) occurs in the vicinity of the steps, as indicated at 50 in Fig. 5. These deposits may be sufficient to cause restriction of the air passages 47 with consequent lessened air flow and resultant shortened life of the combustion chamber structure. Such restriction of the air flow through the risers may also have detrimental effects on temperature distribution, stability and pressure drop. Continued operation under these conditions would eventually result in complete closing of the air passages 47 by deposits.

The present invention overcomes this difficulty by eliminating all surfaces of the wall sections and the spacer members which are at right angles to the flow of air within the combustion space 33, thereby relieving the eddy current conditions producing the deposits of Fig. 5.

To this end the downstream edges of the wall sections 40, 41 and 42 and of the spacer members 46 are beveled, as shown at 51 and 52, respectively, in Fig. 4. An angle of about 30 degrees to the plane of the wall sections has been found to give satisfactory results, although it will be apparent that other angles may also be used to attain the desired effect.

Not only does the beveling materially reduce the eddy currents causing the deposition of fuel refuse, but it also substantially eliminates surfaces out of the direct air or gas stream and on which deposits might form.

While the invention has been shown in but one form, it will be obvious to those skilled in the art that it is not so limited, but is susceptible of various changes and modifications without departing from the spirit thereof.

What is claimed is:

1. In combustion apparatus, wall structure defining a combustion chamber, said wall structure including an annular wall comprising a plurality of annular sections of different diameters arranged coaxially and in order of increasing diameter from the upstream end toward the downstream end of the chamber, the inside diameter of each section being materially greater than the outside diameter of the adjacent smaller section, whereby adjacent sections are radially spaced, and spacer members disposed in the radial spaces between adjacent sections and joining said sections. the downstream ends of the sections and of the spacer members lying in cones whose axes coincide with the longitudinal axis of the chamber, whereby internal surfaces at right angles to the direction of flow of gases therepast and on which lead deposits might accumulate are eliminated.

2. In a combustion chamber, a circumferentially-continuous wall comprising a plurality of circumferentially-continuous sections coaxially arranged relative to the longitudinal axis of the combustion chamber, said sections being of different diameters with the section of smallest diameter near the upstream end of the chamber considered in the direction of gas flow therethrough, and the sections of larger diameter downstream thereof in order of increasing diameter from said section of smallest diameter to the section of largest diameter, whereby the wall is of stepped construction, and spacer members between adjacent ends of adjacent sections, said spacer members constituting risers of the stepped wall construction and providing for admission of air therepast to the combustion chamber, the downstream ends of said sections and of said spacer members being tapered to relatively thin edges, whereby internal surfaces normal to the direction of flow of gases through the combustion chamber and on which deposits might accumulate are avoided.

3. In combustion apparatus, a circumferentially-continuous wall separating a combustion space from an overlapping air space, said wall being provided with openings therethrough for flow of air from the overlapping air space to the combustion space, and the material of said wall at those edges of openings which are exposed to the combustion space being tapered to thin edges incapable of supporting deposits of fuel refuse.

WILLARD L. CHRISTENSEN.

REFERENCES CITED

The following references are of record in the file of this patent:

UNITED STATES PATENTS

| Number | Name | Date |
|---|---|---|
| 2,055,366 | Schrader | Sept. 22, 1936 |
| 2,117,270 | Bloom | May 17, 1938 |